United States Patent [19]
Engelhardt et al.

[11] 3,929,740
[45] Dec. 30, 1975

[54] HYDROLYZED COPOLYMER OF ACRYLONITRILE AND AN UNSATURATED SULFONIC ACID

[75] Inventors: Fritz Engelhardt; Willi Gunzert, both of Frankfurt am Main; Hellmut Georg Jalke, Wiesbaden; Joachim Ribka, Offenbach am Main-Burgel; Gerhard Weckler, Sulzbach, Taunus, all of Germany

[73] Assignee: Cassella Farbwerke Mainkur Aktiengesellschaft, Germany

[22] Filed: Sept. 12, 1974

[21] Appl. No.: 505,523

Related U.S. Application Data

[63] Continuation-in-part of Ser. No. 400,706, Sept. 26, 1973, abandoned.

[30] Foreign Application Priority Data

Oct. 9, 1972 Germany............................ 2249443

[52] U.S. Cl.... 260/79.3 MU; 8/115.6; 117/139.5 A; 260/88.7 B
[51] Int. Cl.$^2$.................. C08F 28/00; C08F 120/44
[58] Field of Search................ 260/79.3 MU, 88.7 B

[56] References Cited
UNITED STATES PATENTS
3,123,588    3/1964    Lunney....................... 260/79.3 MU FOREIGN PATENTS OR APPLICATIONS
566,000    9/1958    Belgium...................... 260/79.3 MU
837,041    6/1960    United Kingdom........ 260/79.3 MU
1,198,753    7/1970    United Kingdom........... 260/88.7 B

*Primary Examiner*—Ronald W. Griffin
*Attorney, Agent, or Firm*—Connolly and Hutz

[57] ABSTRACT

A product obtained from a copolymer of acrylonitrile and an unsaturated sulfonic acid containing 0.1 to 30% by weight of sulfonic acid radicals and having a K-value of 30 to 140, by hydrolyzing said copolymer at a temperature of 70° to 150°C. in an aqueous alkali metal hydroxide solution containing from 8 to 35% by weight of alkali metal hydroxide to saponify the nitrile groups of said copolymer to —$CONH_2$ and —COOR groups where R is the cation of said alkali metal hydroxide and then adjusting the resulting solution to a pH of 6 to 9, said product containing 2 to 15% by weight —$CONH_2$ groups
20 to 68% by weight —COOR groups
0 to 0.5% by weight —CN groups
2 to 20% by weight —$SO_3R$ groups calculated on the solid product and having a K-value of 80 to 150 and said product being useful as a textile aid for sizing and dye padding purposes.

6 Claims, No Drawings

HYDROLYZED COPOLYMER OF ACRYLONITRILE AND AN UNSATURATED SULFONIC ACID

This application is a continuation-in-part of application Ser. No. 400,706, filed Sept. 26, 1973 and now abandoned.

German Patent No. 623,404 discloses the utility of various salts of polyacrylic acid as textile aids for such purposes as sizing, finishing, binding, thickening and dispersing. It is further taught in German Patent No. 580,351 that salts of polyacrylic acid may be prepared by alkaline hydrolysis of polyacrylonitrile.

The present invention is based on the unexpected discovery that alkaline hydrolysis of a copolymer of acrylonitrile and an unsaturated sulfonic acid produces products which are particularly valuable as textile aids and have application advantages over the previously used salts of polyacrylic acid. The products of the instant invention are appropriately defined as comprising those obtained from a copolymer of acrylonitrile and an unsaturated sulfonic acid containing 0.1 to 30% by weight of sulfonic acid radicals and having a K-value of 30 to 140, by hydrolyzing said copolymer at a temperature of 70° to 150°C. in an aqueous alkali metal hydroxide solution containing from 8 to 35% by weight of alkali metal hydroxide to saponify the nitrile groups of said copolymer to $CONH_2$ and COOR groups where R is the cation of said alkali metal hydroxide and then adjusting the resulting solution to a pH of 6 to 9.

Alkaline hydrolysis is preferably carried out under prevailing atmospheric pressure. At reaction temperatures above the boiling point of the aqueous alkaline hydrolysis medium, pressures above normal atmospheric pressure must be employed. The expression "alkali metal hydroxide" as used herein includes all of the hydroxides of the alkali metals as well as those compounds which form alkali metal hydroxide solutions when introduced into water. Generally, sodium or potassium hydroxide is employed, the former being preferred in view of its ready availability and lower cost. Ammonia is a by-product of the hydrolysis reaction. It is advantageous to remove residual traces of ammonia by introducing air or other suitable vapor into the hot reaction solution.

Adjustment of the pH to a value of 6 to 9, preferably 6.5 to 8.5 following hydrolysis can be accomplished by the addition of any suitable acid. Preferred acids include mineral and carboxylic acids such as sulfuric, nitric, phosphoric, formic and acetic acids.

The hydrolysis is being effected until the cyano groups are practically completely saponified to give carbonamide groups and COOR groups. The products of the present invention contain:

2 to 15% by weight —$CONH_2$ groups
20 to 68% by weight —COOR groups
0 to 0.5% by weight —CN groups
2 to 20% by weight —$SO_3R$ groups The numerical values as indicated above refer to the solid product. The products of the present invention are readily water-soluble and have a K-value of 80 to 150. When effecting the hydrolysis as stated above, they are obtained in the form of an aqueous solution normally containing 25% by weight of the products of the instant invention. If the hydrolysis is carried out by means of sodium-hydroxide which is the preferred saponifying agent the preferred products of the present invention are obtained which contain:

8 to 15% by weight —$CONH_2$ groups
35 to 68% by weight —COONa groups
0 to 0.5% by weight —CN groups
2 to 10% by weight —$SO_3Na$ groups These numerical values likewise relate to the solid product. The K-value of the preferred products is 90 to 120.

If used as textile acids, the hydrolysis products are pH-standardized and thinned by means of water to give a solution of 1–25% by weight of the solid product.

The copolymers of acrylonitrile and an unsaturated sulfonic acid which are used to produce the products of the present invention are obtained by copolymerization of acrylonitrile with unsaturated sulfonic acids such as vinyl, allyl, methallyl, 2-allyloxyethane, 2-hydroxy-3-allyloxypropane, vinylbenzene and vinyloxybenzene sulfonic acids. Such copolymers and their preparations are disclosed in United States Pat. Nos. 2,601,256, 2,837,500, 2,837,501, 2,900,370 and 2,913,438, in British Patent Nos. 823,345, 837,041, and in Belgium Patent Nos. 562,290, 566,000 and 587,494. The teaching of these patents are incorporated herein by reference.

Copolymers of acrylonitrile and unsaturated sulfonic acids are used for the preparation of acrylonitrile fibers since they assure good dyeability of the spun fibers by virtue of the functional groups contained in their molecules. Such copolymers of acrylonitrile which are utilized for the preparation of polyacrylic fibers may have up to 20% by weight of copolymerized unsaturated sulfonic acids therein. Accordingly, fibers and fiber waste of such copolymers may serve as starting materials for the products of the present invention.

The textile aids of the present invention are particularly suitable as sizing agents and their use for this purpose is illustrated in the examples appearing hereinafter. Particularly advantageous sizing agents are obtained if the copolymer of acrylonitrile and the unsaturated sulfonic acid which is to be hydrolyzed contains 0.1 to 5% by weight of sulfonic acids groups and has a K value of 40 to 100. Other auxiliary agents such as potato starch, carboxymethylcellulose and polyvinyl alcohol may be added to the hydrolysate of the present invention when it is to be employed as a sizing agent.

The products of the instant invention, because of their migration-preventing effect in the drying of dyed textile materials, also serve as padding aids. The use of such products as padding aids is illustrated in the examples hereinafter. Particularly advantageous padding aids are obtained if the copolymer employed as starting material, has a K value of 70 to 130 and contains 1 to 20% by weight of sulfonic acid radicals.

The present invention is illustrated by the following examples, percentages being percentage by weight.

EXAMPLE 1

Into a 5 liter stirring vessel of steel are introduced 200 g Dolan $^R$ fiber scraps consisting of a copolymer of an unsaturated sulfonic acid and polyacrylonitrile. With a stationary stirring apparatus, a solution of 160 g solid sodium hydroxide in 700 ml water is added in such a manner that the fiber scraps are completely covered by the aqueous soda lye.

The reaction vessel is then heated from outside, so that in the course of 30–40 minutes the liquor has a temperature of 80°–85°C. With a gradual discoloration of the fiber scraps to yellow from intensive dark red, saponification occurs with a separation of ammonia. As soon as the fiber structure is disrupted and the reaction mixture has become glass-transparent, the stirring apparatus is turned on, 1200 ml water is added and the mixture is further heated until a clear, homogenous solution has resulted. With further heating, steam is conducted through the reaction mixture until the escaping water vapor is free of ammonia. Then 700 ml water was added again, so that a well stirrable and pourable solution exists. After cooling down to room temperature, the pH value of the solution is adjusted to 6.6 by drop-wise addition of concentrated sulfuric acid. Obtained are 2170 g of a viscous solution, which is 8.05% based on the copolymer used. The K value of the 1.0% solution is 102.8. The product contained 11% —$CONH_2$ groups, 3.2% —$SO_3Na$ groups, 57% —COONa groups and 0.01 —CN groups based on the solid product. In an analogous manner, acrylonitrile copolymers with allylsulfonic acid, vinylsulfonic acid and vinylbenzenesulfonic acid may be saponified.

EXAMPLE 2

Scraps (100 g) of a polyacrylonitrile fiber modified with methallylsulfonic acid were suspended in a solution of 75 g solid sodium hydroxide in 800 ml water and transferred into an autoclave of steel. Saponification proceeded for 4 hours at a temperature of 125°C., a pressure of 3 atmospheres gauge being achieved. The resulting viscous polymer solution was transferred into a flask and the ammonia was removed at 95°C. by the injection of an air stream. After thinning with 220 ml water to an easily stirrable consistency, the pH value of the reaction mixture was adjusted to 7.1 at room temperature by the addition of acetic acid. Obtained were 1015 g of a viscous solution, which based on the copolymer used, is 9.8%. The K value of the 1.0% solution is 102.6. The product contained 11% —$CONH_2$ groups, 3.2% —$SO_3Na$ groups, 57% —COONa groups and 0.01% —CN groups, based on the solid product.

Analogous products are obtained if potassium hydroxide is used in place of sodium hydroxide.

EXAMPLE 3

A composition consisting of 85 g acrylonitrile and 15 g allylsulfonic acid was polymerized in water at a pH value of 2.0 and a reaction temperature of 55° to 60°C. in accordance with the customary process for the preparation of polyacrylonitrile as described in U.S. Pat. No. 2,693,462. The copolymer which precipitated as an aqueous paste was mixed at room temperature with 220 g 35% aqueous sodium hydroxide and then saponified in accordance with the procedure described in Example 1. Obtained are 1335 g of a clear polymeride solution, which, based on the copolymer used, is 7.5%. The K value of the 1.0% solution is 96.1.

The product contained 10% —$CONH_2$ groups, 4.0% —$SO_3Na$ groups, 56% —COONa groups and 0.015% —CN groups based on the solid product.

EXAMPLE 4

A cotton textile material is impregnated on a foulard with a liquor absorption of 60%, the liquor having the following composition:

| | |
|---|---|
| 30 g | Indanthrene Brown NG Colloisol |
| 10 g | acrylonitrile copolymer saponified in accordance with Example 1 |
| 960 g | water 20°C. |
| 1000 g | |

The preparation of the foulard liquor occurs by thinning the product prepared in accordance with Example 1 with a 10—20 fold by weight water at room temperature and adding the Indanthrene dyestuff dispersed in water. The liquor is then adjusted to 1000 g. The foulard-treated goods are then subsequently dried on a tentering frame. Obtained in an impregnation of the highest conformity of the color depth on the top and underside of the fabric. An analogous test with a saponified acrylonitrile homopolymer yielded clearly visible differences of color depth between the top and the underside of the fabric.

EXAMPLE 5

A fabric consisting of 50% polyester and 50% cotton is impregnated on a foulard with a liquor absorption of 60%, the liquor having the following compositon:

| | |
|---|---|
| 15 g | Samaron Red RL |
| 15 g | Indanthrene Red FRC-type 8059 |
| 10 g | Acrylonitrile copolymer saponified in accordance with Example 2 |
| 960 g | water |
| 1000 g | |

The liquor is prepared as described in Example 1 and the fabric impregnated on a foulard and dried on a frame. Obtained is an impregnation of very good conformity of the color depth on the top and underside of the fabric. A comparative test with a saponified acrylonitrile homopolymer yielded clearly visible differences with respect to the color depth on the top and underside of the fabric.

EXAMPLE 6

A fabric consisting of 50% polyester and 50% cotton is impregnated by means of a foulard with a 60% liquor absorption with the following liquor:

| | |
|---|---|
| 15 g | Samaron Blue FBL |
| 15 g | Remazol Brilliant Blue R |
| 10 g | saponification product from a copolymer of acrylonitrile and allylsulfonic acid prepared in accordance with Example 3 |
| 960 g | water |
| 1000 g | |

For the preparation of the impregnation liquor, the product prepared in accordance with Example 3 is mixed with a 10–20 fold quantity of water, the Samaron dyestuff is dispersed in water, it and the dissolved Remazol dyestuff are added and the liquor is adjusted to 1000 g. Obtained is an impregnation of great uniformity of the fabric. With the use of a saponified acrylonitrile homopolymer, in a comparative test, clearly visible differences regarding the color depth are determined on the top and underside of the fabric.

EXAMPLE 7

An acrylonitrile copolymer with a K value of 68 which contains 0.2% by weight of polymerized allylsulfonic acid is hydrolyzed in accordance with the procedure of Example 1. Finally, the pH is adjusted with sulfuric acid to 7.0 and the solution diluted by the addition of water to such an extent that it has a solids content of 25% by weight. This product was used as a sizing agent by treating crude white cotton fibers with the same on a 9-drum sizing machine of the Sucker Company, Moenchengladbach. The fibers are dipped once in the 85°–95°C. sizing liquor and twice squeezed out between pairs of compression cylinders. The temperature of the heated drums is 130° to 135°C. The remaining treating conditions such as warp tension, residual moisture of the sized warps, etc., correspond to the usual requirements in sizing of cotton yarns. For various compositions of the sizing liquor, liquor absorption and effective capacity in weaving by the determination of the warp fiber breaks per 1000 warp fibers and 100,000 weft fibers are determined. The following results are obtained:

A. In the sizing of Nm 34/1 cotton crude white in the fiber position 35/20 – 34/20

| No. | Aqueous sizing liquor containing | Liquor Absorption | Warp fiber breaks per 1000 warp and 100,000 weft fibers |
|---|---|---|---|
| 1 | 5% potato starch 10% of the sizing product of this example 0.2% Trefix SV 100 | 128 | 2.96 |
| 2 | 10.5% potato starch 0.42% Trefix SV 100 | 145 | 3.80 |
| 3 | 5% potato starch 10% of a 25% solution of a commercial sizing agent (salt of a polyacrylic acid without sulfonic acid groups) 0.2% Trefix SV 100 | 135 | 3.15 |

B. In the sizing of Nm 60/1 cotton crude white in the fiber position 42/28 – 50/50:

| No. | Aqueous sizing liquor containing | Liquor Absorption | Warp fiber breaks per 1000 warp and 100,000 weft fibers |
|---|---|---|---|
| 4 | 8.5% potato starch 8.5% of the sizing product of this example 0.33% Trefix SV 100 | 134 | 3.06 |
| 5 | 12.75% potato starch 0.55% Trefix SV 100 | 150 | 4.23 |
| 6 | 8.5% potato starch 8.5% of a 25% solution of a commercial sizing agent (salt of a polyacrylic acid without sulfonic acid groups) 0.33% Trefix SV 100 | 142 | 3.25 |

Trefix SV 100 is a commercial starch decomposing agent with built-in fatty matter. The percentages given are percentages by weight.

The above results make it clear that the liquor absorption is less with the use of a sizing agent of this invention than with comparative liquors. The sizing liquors 1 and 4 are less viscous than liquors 2, 3, 5 and 6. The less viscous the sizing liquors, the higher may be the speed of the warps. The warp fiber breaks in weaving are clearly lower with liquors 1 and 4 than with the liquors 2, 3, 5 and 6.

What is claimed is:

1. A water-soluble product obtained from a copolymer of acrylonitrile and an unsaturated sulfonic acid containing 0.1 to 30% by weight of sulfonic acid radicals and having a K-value of 30 to 140, by hydrolyzing said copolymer at a temperature of 70° to 150°C. in an aqueous alkali metal hydroxide solution containing from 8 to 35% by weight of alkali metal hydroxide to saponify the nitrile groups of said copolymer to —$CONH_2$ and —COOR groups where R is the cation of said alkali metal hydroxide and then adjusting the resulting solution to a pH of 6 to 9, said product containing 2 to 15% by weight —$CONH_2$ groups
20 to 68% by weight —COOR groups
0 to 0.5% by weight —CN groups
2 to 20% by weight —$SO_3R$ groups calculated on the solid product and having a K-value of 80 to 150 and said product being useful as a textile aid for sizing and dye padding purposes.

2. The product of claim 1 wherein said copolymer has a K-value of 70 to 130 and contains 1 to 20% by weight of sulfonic acid radicals.

3. The product of claim 1 wherein said copolymer has a K-value of 40 to 100 and contains 0.1 to 5% by weight of sulfonic acid radicals.

4. The product of claim 1 wherein said unsaturated sulfonic acid is selected from the group consisting of vinyl, allyl, methallyl, 2-allyloxyethane, 2-hydroxy-3-allyloxypropane, vinylbenzene and vinyloxybenzene sulfonic acids.

5. The product of claim 1 wherein said pH is adjusted to 6.5 to 8.5.

6. The product of claim 1 wherein said alkali metal hydroxide is sodium hydroxide and said product contains:

8 to 15% by weight —$CONH_2$ groups
35 to 68% by weight —COONa groups
0 to 0.5% by weight —CN groups
2 to 10% by weight —$SO_3Na$ groups

* * * * *